(12) United States Patent
Lenart et al.

(10) Patent No.: US 7,653,804 B2
(45) Date of Patent: Jan. 26, 2010

(54) RESOURCE SHARING IN MULTIPLE PARALLEL PIPELINES

(75) Inventors: Thomas A. Lenart, Lund (SE); Jorn W. Janneck, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 100 days.

(21) Appl. No.: 11/340,279

(22) Filed: Jan. 26, 2006

(65) Prior Publication Data

US 2007/0174593 A1    Jul. 26, 2007

(51) Int. Cl.
  *G06F 15/82* (2006.01)
(52) U.S. Cl. .............................. 712/18; 712/23; 712/25; 712/201
(58) Field of Classification Search ................. 712/25, 712/201, 23, 18, 26
  See application file for complete search history.

(56) References Cited

U.S. PATENT DOCUMENTS

| | | | | |
|---|---|---|---|---|
| 4,145,733 A | * | 3/1979 | Misunas et al. ............. | 718/106 |
| 4,750,112 A | * | 6/1988 | Jones et al. ................. | 712/217 |
| 5,249,274 A | * | 9/1993 | Sztipanovits et al. ........ | 712/201 |
| 5,475,227 A | * | 12/1995 | LaRue ......................... | 250/397 |
| 5,941,983 A | * | 8/1999 | Gupta et al. ................. | 712/214 |
| 6,138,230 A | * | 10/2000 | Hervin et al. ............... | 712/216 |
| 6,279,100 B1 | * | 8/2001 | Tremblay et al. ............. | 712/24 |
| 7,007,156 B2 | * | 2/2006 | Stark et al. .................. | 712/220 |
| 7,380,232 B1 | * | 5/2008 | Schumacher et al. .......... | 716/18 |
| 2005/0166205 A1 | * | 7/2005 | Oskin et al. ................. | 718/103 |

OTHER PUBLICATIONS

"Dataflow: The Road Less Complex"; Swanson, K Michelson, A Schwerin, M Oskin—The Workshop on Complexity-effective Design, WCED, 2003.*
"Dataflow Architectures"; Deepika S., Kot L., "Dataflow Architectures," Digital. Image Computing and Applications 97 in New Zealand,. 1997.*
"Perspectives of data-flow architectures"; Annals of Operations Research ; vol. 16, Issue 1-4 (Dec. 1988); pp. 281-297 ; Year of Publication: 1988.*
"Data Flow Supercomputers"; Dennis, J.B. ; This paper appears in: Computer; Publication Date: Nov. 1980; vol. 13, Issue: 11; On pp. 48-56.*
"Dataflow machine architecture"; Arthur H. Veen; ACM Computing Surveys; vol. 18, Issue 4 (Dec. 1986); pp. 365-396; Year of Publication: 1986.*

(Continued)

*Primary Examiner*—Eddie P Chan
*Assistant Examiner*—Keith Vicary
(74) *Attorney, Agent, or Firm*—W. Eric Webostad; Thomas George

(57) ABSTRACT

A signal processing network and method for generating code for such a signal processing network are described. Pipeline blocks are each coupled to receive control signaling and associated information signaling from a scheduler. Each of the pipeline blocks respectively includes an allocation unit, a pipeline, and section controllers. The allocation unit is configured to provide a lock signal and sequence information to the section controllers in each of the pipeline blocks. The section controllers are configured to maintain in order inter-pipeline execution of the sequence responsive to the sequence information and the lock signal.

8 Claims, 19 Drawing Sheets

OTHER PUBLICATIONS

"Advances in the dataflow computational model"; Walid A. Najjar; Edward A. Lee; Guang R. Gao; Parallel Computing; vol. 25, Issue 13-14 (Dec. 1999); Special Anniversary issue; pp. 1907-1929.*

"Dataflow Architectures and Multithreading"; Ben Lee; A. R. Hurson; Computer vol. 27, Issue 8 (Aug. 1994); pp. 27-39; Year of Publication: 1994.*

"On new generation dataflow architecture"; Shimada, T.; This paper appears in: Design and Application of Parallel Digital Processors, 1988., International Specialist Seminar on the; Publication Date: Apr. 11-15, 1988; On pp. 112-115.*

Fine-Grain Pipelined Asynchronous Adders for High-Speed DSP Applications; Montek Singh Steven M. Nowick; Proceedings of the IEEE Computer Society Annual Workshop on VLSI (WVLSI'00); Year of Publication: 2000.*

"An efficient pipelined dataflow processor architecture"; Dennis, J.B. Gao, G.R.; Supercomputing '88. [vol. 1]. Proceedings. Publication Date: Nov. 14-18, 1988; On pp. 368-373.*

Xilinx, Inc.; "The Programmable Logic Data Book 2000"; published Apr. 2000; available from Xilinx, Inc., 2100 Logic Drive, San Jose, California 95124; pp. 3-75 through 3-96.

J. Eker and J.W. Janneck; "CAL Language Report—Specification of the CAL actor Language"; Version 1.0, document edition 1; ERL Technical Memo UCB/ERL, M03/48; University of California at Berkeley; Dec. 1, 2003; pp. 1-112.

* cited by examiner

```
entity allocator is
    generic ( WAVE_BITS : integer := 4 );
    port (
        clk    : in  std_logic;
        rst    : in  std_logic;
        validi : in  std_logic;
        valido : out std_logic;
        acki   : in  std_logic;
        acko   : out std_logic;
        wave   : out std_logic_vector(WAVE_BITS-1 downto 0);
        seq    : out std_logic_vector(WAVE_BITS-1 downto 0);
        alloc  : out std_logic
    );
end;

architecture behavioural of allocator is type reg_type is record
    seq : std_logic_vector(WAVE_BITS-1 downto 0);
end record;

signal r, rin : reg_type;

begin

---------------------------------------
    -- Combinatorial logic
    --------------------------------------- process(r, rst, validi, acki)
        variable v : reg_type;
        variable send_alloc : std_logic;
```

FIG. 5B-1

```
                                                                    550 begin
    v := r;
    send_alloc := '0';

if (acki = '1') then
        send_alloc := '1';
        v.seq := r.seq + 1;
    end if;

if (rst = '0') then
        v.seq := (others => '0');
    end if;

alloc  <= send_alloc;
    wave   <= r.seq;
    seq    <= r.seq;

rin <= v;
end process;

valido <= validi;
acko   <= acki;

-- ------------------------------------
-- Sequential Update
-- ------------------------------------ process(clk)
begin
    if rising_edge(clk) then
        r <= rin;
    end if;
end process;
end;
```

FIG. 5B-2

```
entity sectionctrl is
  generic ( WAVE_BITS    : integer := 3;
            INTERFACES   : integer := 2;
            IF_LOG2      : integer := 1;
            NO_LOCK      : integer := 0;
            STACKSIZE    : integer := 2);
  port (
    clk     : in  std_logic;
    rst     : in  std_logic;
    valid   : in  std_logic;
    wavei   : in  std_logic_vector(WAVE_BITS-1 downto 0);
    waveo   : out std_logic_vector(WAVE_BITS-1 downto 0);
    seq     : in  std_logic_vector(WAVE_BITS-1 downto 0);
    lock    : in  std_logic_vector(INTERFACES-1 downto 0);
    unlock  : in  std_logic_vector(INTERFACES-1 downto 0);
    secexit : in  std_logic;
    enter   : out std_logic
  );
end;

architecture behavioural of sectionctrl is subtype wave_type is std_logic_vector(WAVE_BITS-1 downto 0);
subtype counter_type is std_logic_vector(IF_LOG2-1 downto 0);

type stack_type is array(0 to STACKSIZE-1) of wave_type;

type stack_record is record
  stack   : stack_type
  valid   : std_logic;
  counter : counter_type;
end record;
```

```
type lock_type is array(0 to INTERFACES-1 of stack_record;

type reg_type is record
    cs_empty : std_logic;
    wave     : wave_type;
    lock     : lock_type;
end record;

constant cnt_one : counter_type := CONV_STD_LOGIC_VECTOR(1, IF_LOG2);

signal r, rin : reg_type;

signal dbg_empty, dbg_valid, dbg_lock : std_logic;

begin

------------------------------------------------------------
-- Combinatorial Logic
------------------------------------------------------------ process(r, rst, valid, wavei, seq, lock, unlock, secexit)
    variable v        : reg_type
    variable transfer : std_logic;
    variable nolock   : std_logic;
    variable index    : counter_type;
begin
    v := r;

nolock := '1';
```

```
-- exit CS -----------------------------------------------------
if (secexit) = '1') then
    v.cs_empty := '1';
end if;

-- lock ---------------------------------------------------------
if (NO_LOCK = 0) then
    for i in 0 to INTERFACES-1 loop
        if (lock(i) = '1') then
            index := r.lock(i).counter;
            v.lock(i).stack(CONV_INTEGER(index)) := seq;
            v.lock(i).valid := '1';
            v.lock(i).counter := r.lock(i).counter + 1;
        end if;
    end loop;

-- unlock -------------------------------------------------------
    for i in 0 to INTERFACES-1 loop
        if (unlock(i) = '1') then
            for s in 1 to STACKSIZE-1 loop
                v.lock(i).stacks(s-1) := v.lock(i).stacks(s);
            end loop;
            if (r.lock(i).counter = cnt_one) then
                v.lock(i).valid := '0';
            end if;
            v.lock(i).counter := r.lock(i).counter - 1;
        end if;
    end loop;
```

FIG. 6B-3

```
-- lock status ------------------------------------------
for i in 0 to INTERFACES-1 loop
    if  (wavei = r.lock(i).stack(0)) and
        (r.lock(i).valid = '1') then
        nolock := '0';
    end if;
end loop;

end if;

-- transfer status ---------------------------------------
if (r.cs_empty and valid and nolock) = '1' then
    transfer := '1';
else
    transfer := '0';
end if;

-- debug signals -----------------------------------------
-- pragma translate_off
dbg_empty <= r.cs_empty;
dbg_valid <= valid;
dbg_lock  <= nolock;
-- pragma translate_on -- a transfer --------------------------------------------
if (transfer = '1') then
    v.wave := wavei
    v.cs_empty := '0';
end if;
```

```
-- reset --------------------------------- if (rst = '1') then
    v.wave := (others => '1');
    v.cs_empty := '1';
    if (NO_LOCK = 0) then
        for i in 0 to INTERFACES-1 loop
            v.lock(i).counter := (others => '0');
            v.lock(i).valid   := '0';
        end loop;
    end if;
end if;

-- drive outputs ------------------------- enter <= transfer;
waveo <= r.wave;

rin <= v;
end process;

------------------------------------------
-- Sequential Update
------------------------------------------ process(clk)
begin
    if rising_edge(clk) then
        r <= rin;
    end if;
end process;

end;
```

FIG. 6B-5

RESOURCE SHARING IN MULTIPLE PARALLEL PIPELINES

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD OF THE INVENTION

One or more aspects of the invention relate generally to integrated circuits and, more particularly, to managing and enhancing execution over parallel pipelines.

BACKGROUND OF THE INVENTION

Programmable logic devices ("PLDs") are a well-known type of integrated circuit that can be programmed to perform specified logic functions. One type of PLD, the field programmable gate array ("FPGA"), typically includes an array of programmable tiles. These programmable tiles can include, for example, input/output blocks ("IOBs"), configurable logic blocks ("CLBs"), dedicated random access memory blocks ("BRAMs"), multipliers, digital signal processing blocks ("DSPs"), processors, clock managers, delay lock loops ("DLLs"), and so forth. Notably, as used herein, "include" and "including" mean including without limitation.

One such FPGA, the Xilinx Virtex® FPGA, is described in detail in pages 3-75 through 3-96 of the Xilinx 2000 Data Book entitled "The Programmable Logic Data Book 2000" (hereinafter referred to as "the Xilinx Data Book"), published April, 2000, available from Xilinx, Inc., 2100 Logic Drive, San Jose, Calif. 95124. (Xilinx, Inc., owner of the copyright, has no objection to copying these and other pages referenced herein but otherwise reserves all copyright rights whatsoever.)

Another type of PLD is the Complex Programmable Logic Device ("CPLD"). A CPLD includes two or more "function blocks" connected together and to input/output ("I/O") resources by an interconnect switch matrix. Each function block of the CPLD includes a two-level AND/OR structure similar to those used in Programmable Logic Arrays ("PLAs") and Programmable Array Logic ("PAL") devices. Other PLDs are programmed by applying a processing layer, such as a metal layer, that programmably interconnects the various elements on the device. These PLDs are known as mask programmable devices. PLDs can also be implemented in other ways, for example, using fuse or antifuse technology. The terms "PLD" and "programmable logic device" include but are not limited to these exemplary devices, as well as encompassing devices that are only partially programmable.

For purposes of clarity, FPGAs are described below though other types of PLDs may be used. FPGAs may include one or more embedded microprocessors. For example, a microprocessor may be located in an area reserved for it, generally referred to as a "processor block."

A problem with parallelizing a signal processing algorithm over multiple pipelines, such as may be implemented in a multi-processor or multi-threaded system, is data dependencies associated with preservation of the order of execution of data. Conventionally, state and feedback loops in such systems cause execution to stall or wait until data becomes available to preserve the order of execution. Particularly, with respect to stateful resources, such as state variables, they may only be modified one user at a time to preserve the order of execution. Thus, only one thread or processor may use such resources at a time.

Heretofore, to preserve the order of execution, resource allocation tables were used. These tables consume a significant amount of circuitry and were conventionally implemented with software primitives for "score boarding." Software primitives used for sharing stateful resources are generally "critical sections" and "semaphores" containing code that allows only one processor or thread to execute at a time.

Accordingly, it would be desirable and useful to provide means to share resources with parallel processing that uses less circuitry than the above-mentioned examples.

SUMMARY OF THE INVENTION

One or more aspects of the invention generally relate to integrated circuits and, more particularly, to managing and enhancing execution over parallel pipelines.

An aspect of the invention is a signal processing network. Pipeline blocks are each coupled to receive control signaling and associated information signaling from a scheduler. Each of the pipeline blocks respectively includes an allocation unit, a pipeline, and section controllers. The pipeline is sectioned into one or more stages. The one or more stages are controlled by pairs of the section controllers with one section controller of each pair for controlling an entry boundary and another section controller of the pair for controlling an exit boundary of each of the one or more stages. The pipeline is coupled to receive an information signal of the information signaling from the scheduler. The allocation unit is coupled to receive a control signal of the control signaling from the scheduler. The control signal is associated with a sequence of the control signaling and associated information signaling. The allocation unit is configured to provide a lock signal to the section controllers in each of the pipeline blocks. The lock signal is associated with resources targeted for use by the pipeline associated with the allocation unit. The allocation unit is configured to provide sequence information associated with the sequence to the section controllers of the pipeline block associated with the allocation unit. The section controllers are configured to maintain in order inter-pipeline execution of the sequence responsive to the sequence information and the lock signal and are configured to provide unlock signaling.

Another aspect of the invention is a method for generating code for pipelining. A dataflow is obtained. The dataflow is partitioned into sections. The sections are coupled to form pipelines. Intra-pipeline and inter-pipeline dependencies are resolved using an allocation unit and section controllers associated with each pipeline of the pipelines.

Yet another aspect of the invention is a storage medium encoded with machine-readable computer program code. When executed by a processor, the machine-readable computer program code causes execution of the method as described in the preceding paragraph.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 5B-1 and 5B-2 is an example of an HDL listing of an example implementation of the allocation unit of FIG. 5A.

FIGS. 6B-1, 6B-2, 6B-3, 6B-4, and 6B-5 in combination are an example of an HDL listing of an example implementation of the section controller of FIG. 6A.

DETAILED DESCRIPTION OF THE DRAWINGS

In the following description, numerous specific details are set forth to provide a more thorough description of the specific embodiments of the invention. It should be apparent, however, to one skilled in the art, that the invention may be practiced without all the specific details given below. In other instances, well known features have not been described in detail so as not to obscure the invention. For ease of illustration, the same number labels are used in different diagrams to refer to the same items; however, in alternative embodiments the items may be different.

Figure 1:
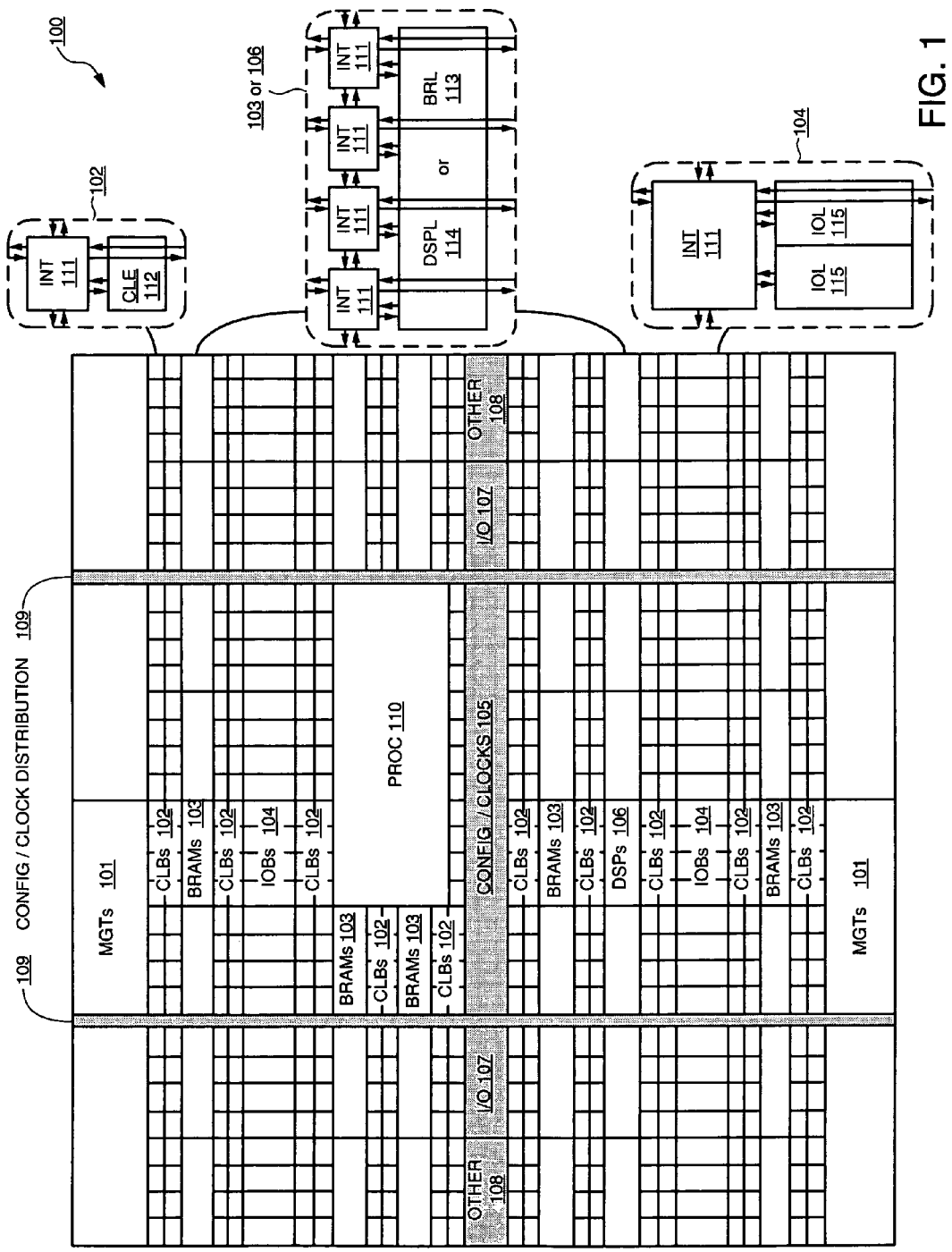
FIG. 1 is a simplified block diagram depicting an exemplary embodiment of a columnar Field Programmable Gate Array ("FPGA") architecture in which one or more aspects of the invention may be implemented.

FIG. 1 illustrates an FPGA architecture 100 that includes a large number of different programmable tiles including multi-gigabit transceivers ("MGTs") 101, configurable logic blocks ("CLBs") 102, random access memory blocks ("BRAMs") 103, input/output blocks ("IOBs") 104, configuration and clocking logic ("CONFIG/CLOCKS") 105, digital signal processing blocks ("DSPs") 106, specialized input/output ports ("I/O") 107 (e.g., configuration ports and clock ports), and other programmable logic 108 such as digital clock managers, analog-to-digital converters, system monitoring logic, and so forth. Some FPGAs also include dedicated processor blocks ("PROC") 110. In some FPGAs, each programmable tile includes a programmable interconnect element ("INT") 111 having standardized connections to and from a corresponding interconnect element 111 in each adjacent tile. Therefore, the programmable interconnect elements 111 taken together implement the programmable interconnect structure for the illustrated FPGA. Each programmable interconnect element 111 also includes the connections to and from any other programmable logic element(s) within the same tile, as shown by the examples included at the right side of FIG. 1.

For example, a CLB 102 can include a configurable logic element ("CLE") 112 that can be programmed to implement user logic plus a single programmable interconnect element 111. A BRAM 103 can include a BRAM logic element ("BRL") 113 in addition to one or more programmable interconnect elements 111. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element ("DSPL") 114 in addition to an appropriate number of programmable interconnect elements 111. An IOB 104 can include, for example, two instances of an input/output logic element ("IOL") 115 in addition to one instance of the programmable interconnect element 111. As will be clear to those of skill in the art, the actual I/O pads connected, for example, to the I/O logic element 115 are manufactured using metal layered above the various illustrated logic blocks, and typically are not confined to the area of the I/O logic element 115.

In the pictured embodiment, a columnar area near the center of the die (shown shaded in FIG. 1) is used for configuration, I/O, clock, and other control logic. Vertical areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block 110 shown in FIG. 1 spans several columns of CLBs and BRAMs.

Note that FIG. 1 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the right side of FIG. 1 are purely exemplary. For example, in an actual FPGA more than one adjacent column of CLBs is typically included wherever the CLBs appear, to facilitate the efficient implementation of user logic. FPGA 100 illustratively represents a columnar architecture, though FPGAs of other architectures, such as ring architectures for example, may be used. FPGA 100 may be a Virtex-4™ FPGA from Xilinx of San Jose, Calif.

Hardware may be described using a dataflow language. As will be appreciated from the following description, use of a dataflow language reveals parallelism within such hardware. A translation tool for translating a circuit design ("design") description in a dataflow language into hardware may be used to construct hardware configured to exploit parallelism, namely for example execute multiple dependent dataflows at some target or maximum throughput.

However, parallel dataflows sharing stateful resources involve using a locking mechanism to maintain a correct order of execution. As described below in additional detail, a locking architecture is proposed to preserve the order of execution to facilitate exploiting parallelism.

Multi-processor or multi-threaded systems use state and feedback loops that may wait until shared resources becomes available. Software primitives share stateful resources using code that prevents more than one processor thread from executing at a time. An example of a stateful resource is a state variable which may only be modified by one system user at a time, and where order of execution of such state variable is to be preserved in order for the correct outcome to result. This is in contrast to a stateless resource which may have only one system user at a time but which is not affected by out-of-order execution. Accordingly, hardware may be parallelized to increase throughput but generate the same output result by preserving the order of execution through multiple parallel data processing paths.

A signal processing algorithm may be thought of as a network of computational nodes. The network may be separated into a number of computational pipelines that share stateful and stateless resources with one another. Each pipeline may contain data from one or more data streams provided no race condition on stateful resources results. In other words, pipelines may run concurrently provided the order of execution is preserved. With this understanding, a locking mechanism is described to preserve order of execution among pipelines to parallelize signal processing to enhance or maximize throughput of a signal processing network.

Figure 2:
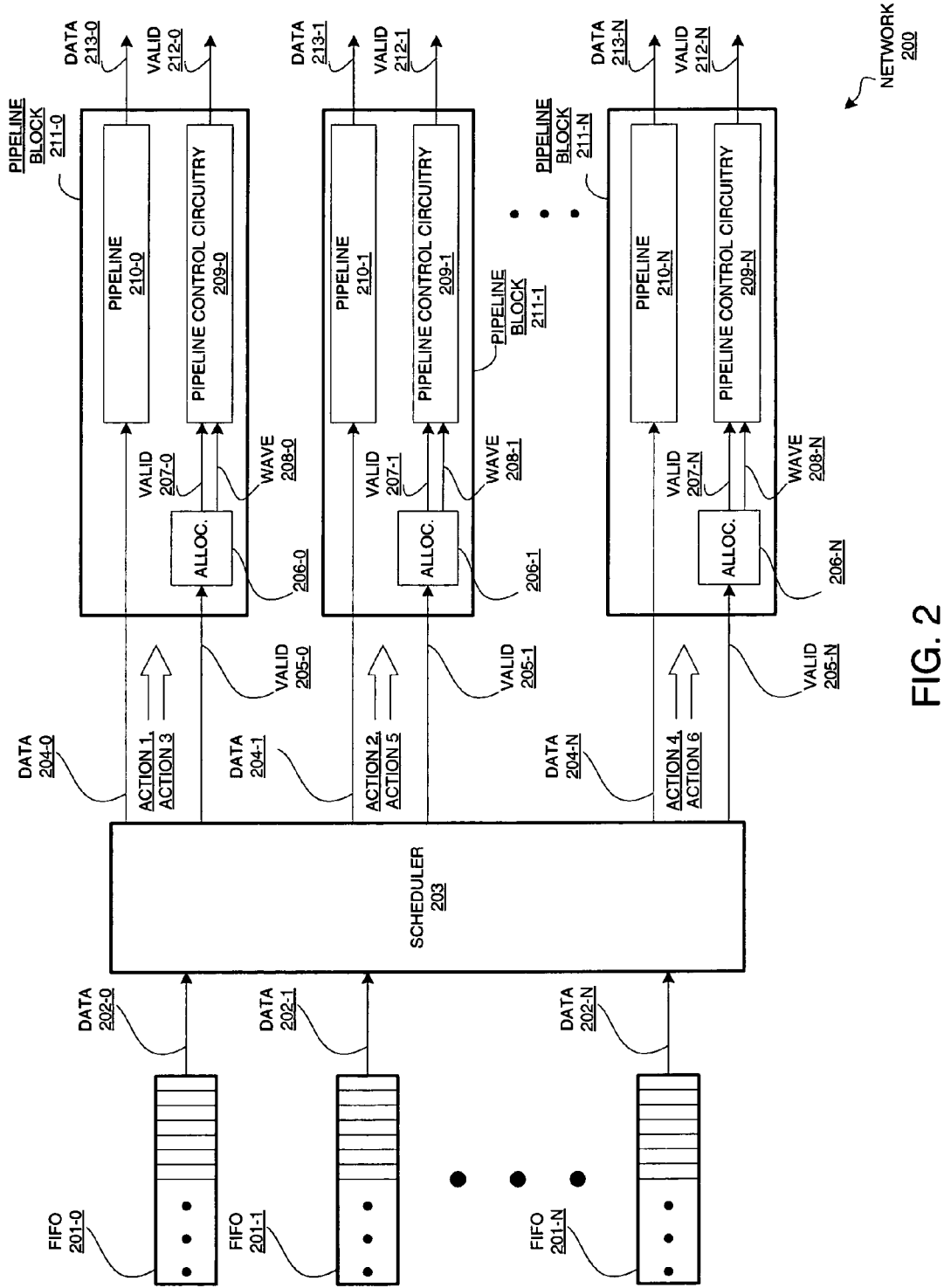
FIG. 2 is a block diagram depicting an exemplary embodiment of a signal processing network.

FIG. 2 is a block diagram depicting an exemplary embodiment of a signal processing network 200. For purposes of clarity by way of example and not limitation, signal processing network 200 is described as a data processing network, though other types of signals may be pipelined, including control signals. It should be appreciated that data processing network 200 may be implemented in an FPGA, such as a Virtex-4 from Xilinx, Inc. of San Jose, Calif. More particularly, BRAMs of such an FPGA may be configured as first in-first out buffer memories ("FIFOs") to facilitate an implementation of data processing network 200. Although the description that follows is in terms of implementing data processing network 200 in an FPGA, it should be understood that other types of PLDs, as well as other types of integrated circuits, whether they have programmable logic or not, may be used. Furthermore, it should be appreciated that signal processing network 200 may be used for digital signal processing.

Data processing network 200 includes scheduler 203 coupled to one or more pipeline blocks 211-0 through 211-N. Each pipeline block 211-0 through 211-N may respectively include a pipeline 210-0 through 210-N as well as an allocation unit 206-0 through 206-N, which provides respective valid signals 207-0 through 207-N and wave signals 208-0 through 208-N to pipeline control circuitry 209-0 through 209-N, as shall be described in further detail below. Pipeline blocks 211-0 through 211-N output respective data signals 213-0 through 213-N and valid signals 212-0 through 212-3, as also shall be described in further detail below.

Notably, from the description that follows it will be appreciated that both inter-pipeline and intra-pipeline resource locking may be used. Accordingly, it should be appreciated that a single pipeline or multiple pipelines can be implemented with locking of resources as described herein. However, as advantage may result in using multiple pipelines to enhance or maximize data throughput, the following description is in terms of multiple pipelines. Still, it should be appreciated that data processing network 200 may process data concurrently inside of each pipeline block 211-0 through 211-N through use of multiple sections or stages, as well as concurrently process data between pipeline blocks 211-0 through 211-N. Though pipeline blocks 211-0 through 211-N are not illustratively shown as being coupled to one another in the high-level block diagram of FIG. 2, it shall be appreciated from the following description that such blocks may be coupled to one another for execution control between pipelines. Data, or other types of signals, may be processed by data processing network 200 by first being buffered in FIFOs 201-0 through 201-N in respective data streams. Thus, output of each FIFO 201-0 through 201-N is a respective data stream, namely data streams 202-0 through 202-N, which output is input to scheduler 203.

Notably, FIFOs 201-0 through 201-N may be thought of as input ports of scheduler 203 configured to buffer a fixed number of tokens as that term is used in the dataflow language known as CAL. CAL or "Cal Actor Language" was designed by Johan Eker and Jorn W. Janneck at the University of California at Berkeley. The publication on CAL by J Eker and JW Janneck, entitled the "CAL Language Report", ERL Technical Memo UCB/ERL M03/48, University of California at Berkeley, December 2003, is herein incorporated by reference. Tokens in CAL are amounts of data. The remainder of this description is done using the dataflow language CAL in order to more fully appreciate use of a dataflow language to reveal parallelism.

Thus, in CAL terms, scheduler 203 may be thought of as an action scheduler. Action scheduler 203 determines which action to output or trigger responsive to a current state and input tokens received from data streams 202-0 through 202-N. An actor is a processing network, such as pipeline block 211-0, that is configured to read data from input ports, modify state, and write data to output ports. Input and output ports of action scheduler 203, action scheduler 203 itself, and one or more actions output from action scheduler 203 may be considered building blocks of an actor. An action only operates when it is asserted, namely when it is triggered by action scheduler 203. Again, since actors have an ability to modify state, a correct order of execution is to be preserved with respect to stateful resources. Thus, there may be dependency between actors, as well as between individual triggering of actions. Dependency between individual triggering of actions is referred to as a wave of execution. There may be multiple waves of execution, where each such wave includes one or more actions.

Action scheduler 203 evaluates inputs from one or more data streams 202-0 through 202-N as well as the current state for each, and outputs one or more actions based on these conditions. An example of a condition may be: "if two tokens are available on input port 0 of scheduler 203, and the second token of the two is greater than 5, then output action 1." The actual implementation of scheduler 203 will be application dependent depending on the type of data or signal processing involved. However, an action is in effect the assertion of a valid data signal in this example or, more generally, a load signal in association with a data signal.

Thus, in this example, action scheduler 203 issues valid data signals 205-0 through 205-N respectively associated with data signals 204-0 through 204-N. These pairs of data and valid signals are in effect actions, such as actions 1 through 6 for example, which are respectively issued to pipeline blocks 211-0 through 211-N. As mentioned above, these actions may be issued as multiple waves, such as actions 1 and 2 in one wave, actions 3, 4, and 5 in another wave, and action 6 in yet another wave, where the actions have an associated sequence of execution. For example, pipeline block 211-0 may be issued a first action, namely action 1, and pipeline block 211-1 may be issued action 2. For purposes of clarity, it shall be assumed that N is equal to two, though fewer or more than that number of pipelines may be implemented in accordance with the scope of this disclosure. Furthermore, it should be understood that the number of data streams need not equal the number of pipelines, but this is merely done for convenience as more than one data stream may be multiplexed for feeding into a pipeline.

As is generally understood with respect to pipeline architectures, data is input on an input side and output on an output side of the pipeline. However, a pipeline may have multiple stages or sections, and thus before an initial set of data input on the input side is completely processed and provided on the output side, another amount of data may be provided on the input side for processing. Thus, data may be processed at different stages of the pipeline, where such data originated from different inputs.

For example, action 1 may be provided to pipeline block 211-0, action 2 may be provided to pipeline block 211-1, action 3 may be provided to pipeline block 211-0, action 4 may be provided to pipeline block 211-N for N equal to 2 ("211-2"), action 5 may be provided to pipeline block 211-1, and action 6 may be provided to pipeline block 211-2. The order in which these actions are provided is to be preserved as data associated with such actions is processed through pipeline blocks 211-0 through 211-2. In other words, throughput is dependent not only on the rate at which actions are triggered, but also on data dependencies as well as resource sharing associated with processing data through such pipelines. Thus, it would not be prudent to have one action wait on another action to finish execution before it could be triggered. Furthermore, it would not be prudent if one action has to be completed before another action can be scheduled. Thus, by triggering actions and allowing the actions to deal with data dependencies and resource sharing, throughput may be enhanced or maximized.

Figures 3A, 3B:
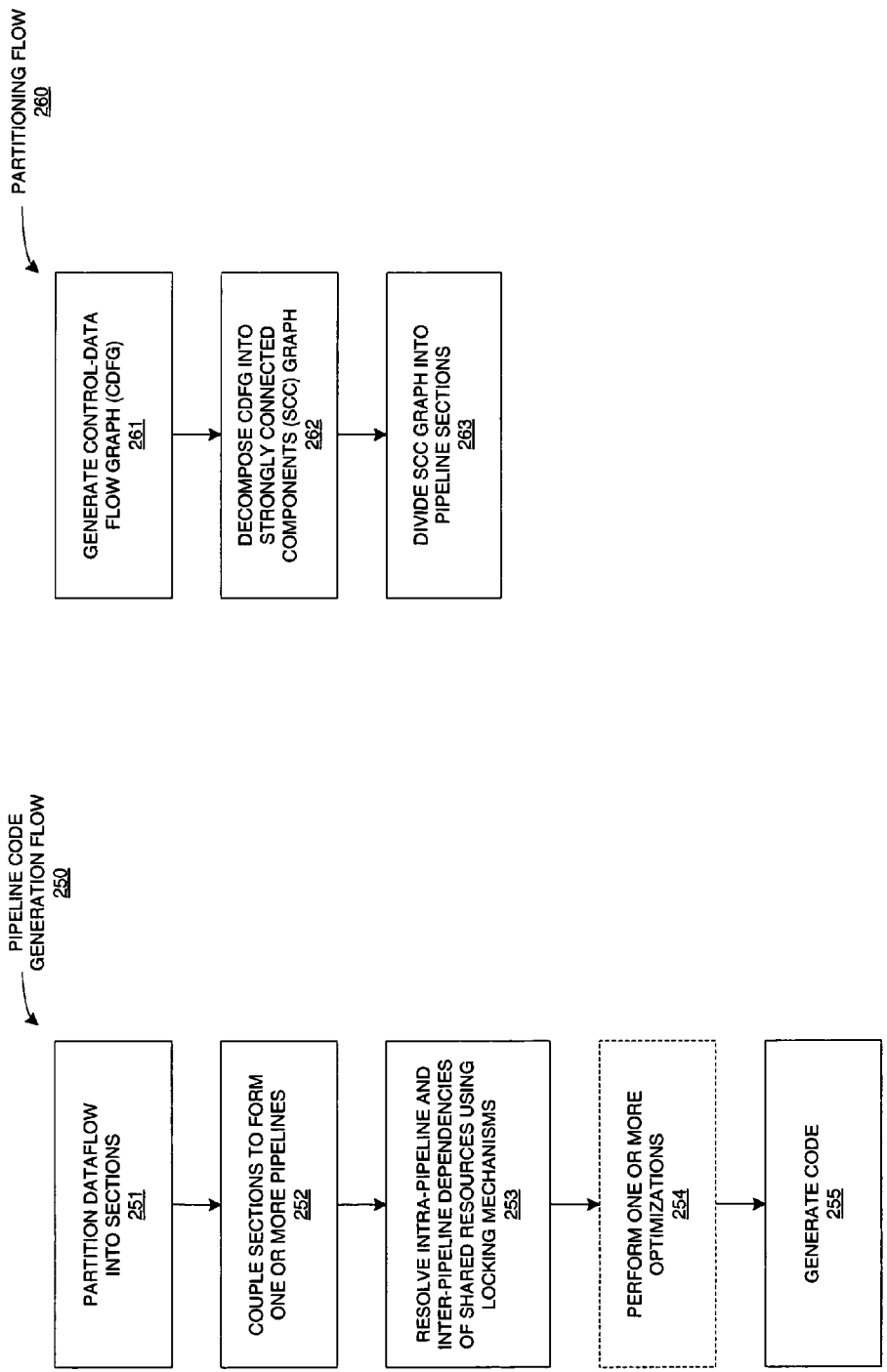
FIG. 3A is a flow diagram depicting an exemplary embodiment of a pipeline code generation flow.
FIG. 3B is a block diagram depicting an exemplary embodiment of a partitioning flow which may be used to partition a dataflow into sections at the first step of the pipeline code generation flow of FIG. 3A.

In order to further understand how data processing network 200 may be broken up into pipeline blocks, it should be understood how each pipeline may be partitioned into sections or stages along with an understanding of dependencies with regard to shared stateful resources. Accordingly, FIG. 3A is a flow diagram depicting an exemplary embodiment of a pipeline code generation flow 250. Pipeline code generation flow 250 is to generate code from a dataflow in order to provide for a realization of a pipeline block. Examples of outcomes of pipeline code generation flow 250 may include logic simulation and logic synthesis, such as in a Hardware Description Language ("HDL"). Furthermore, outcome of a pipeline code generation flow 250 may be used for a dataflow simulation, such as may be implemented in Extensible Markup Language ("XML").

At 251, a dataflow, such as for data processing network 200, is partitioned into sections. FIG. 3B is a block diagram depicting an exemplary embodiment of a partitioning flow 260 which may be used to partition a dataflow into sections at 251. With simultaneous reference to FIGS. 3A and 3B, partitioning flow 260 and pipeline code generation flow 250 are described. At 261, a control-data flow graph ("CDFG") is generated for a signal processing network design. At 262, the CDFG generated at 261 is decomposed into a strongly connected components ("SCC") graph. Thus, it should be understood that at 251 an initial dataflow model, which is a set of coupled combinatorial or pipeline components, is clustered into components that are strongly connected.

At 263, the SCC graph generated at 262 is divided into sections. These sections introduce pipeline sections or stages. As all connections go in the same direction, no SCCs are bisected.

At 252, sections identified at 263 are coupled to form one or more pipelines. Accordingly, after partitioning a dataflow model into sections associated with SCC clusters, such sections may be coupled at 252 to form one or more pipelines. For example, by connecting two sections with a feedback loop, execution between input and output for such connected sections may be made exclusive to only one wave or action at a time. Thus, sections are coupled such that the last use of a resource connects back to the first use of the same resource. This prevents two waves from accessing the same resource at the same time. This feedback loop may be referred to as the usage range of the resource. The first use of a resource may be called the entry point, and the last use of a resource may be called the exit point.

At 253, intra-pipeline and inter-pipeline dependencies may be resolved with respect to sharing of resources. Resolution of sharing of resources, including stateful or stateless resources, is addressed using locking mechanisms, which are described below in additional detail. Optionally, at 254, one or more optimizations may be performed after resolving intra-pipeline and inter-pipeline dependencies at 253. At 255, code for the one or more pipelines may be generated.

Figure 3C:
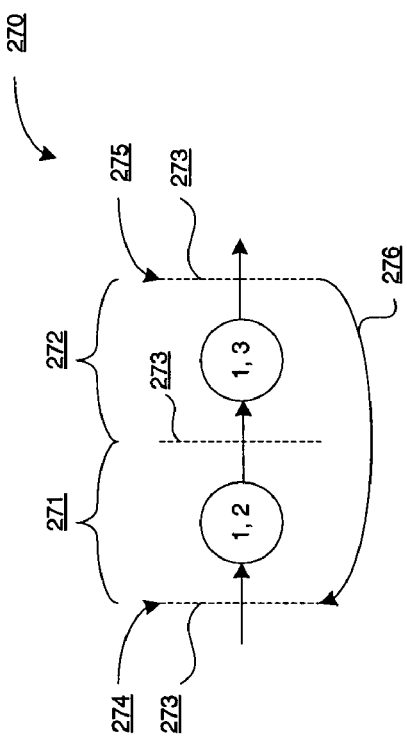
FIG. 3C is a graphical representation depicting an exemplary embodiment of a pipeline.

FIG. 3C is a graphical representation depicting an exemplary embodiment of a pipeline 270. Pipeline 270 may be a pipeline of pipelines 210 of FIG. 2. Pipeline 270 includes sections 271 and 272, which are coupled for dataflow from section 271 to section 272. Dashed lines 273 delineate boundaries of sections 271 and 272. Within each of sections 271 and 272 are identified resources used during data processing within each of those respective sections. For example, resources 1 and 2 are used to process data in section 271 and resources 1 and 3 are used to process data in section 272. An entry point generally indicated at 274 for usage of resource 1 is at the beginning of section 271 and an exit point generally indicated at 275 for usage of resource 1 is at the end of section 272. Thus, feedback signal 276 notifies entry point 274 of section 271 that a preceding wave has completed its usage of a resource, in this example resource 1, owing to the completion of data processing using such resource, in this example in a subsequent section 272. Notably, because resources 2 and 3 are included in the usage range of resource 1, generally indicated by feedback signal 276, no additional locking for resources 2 and 3 need be used.

Figure 3D:
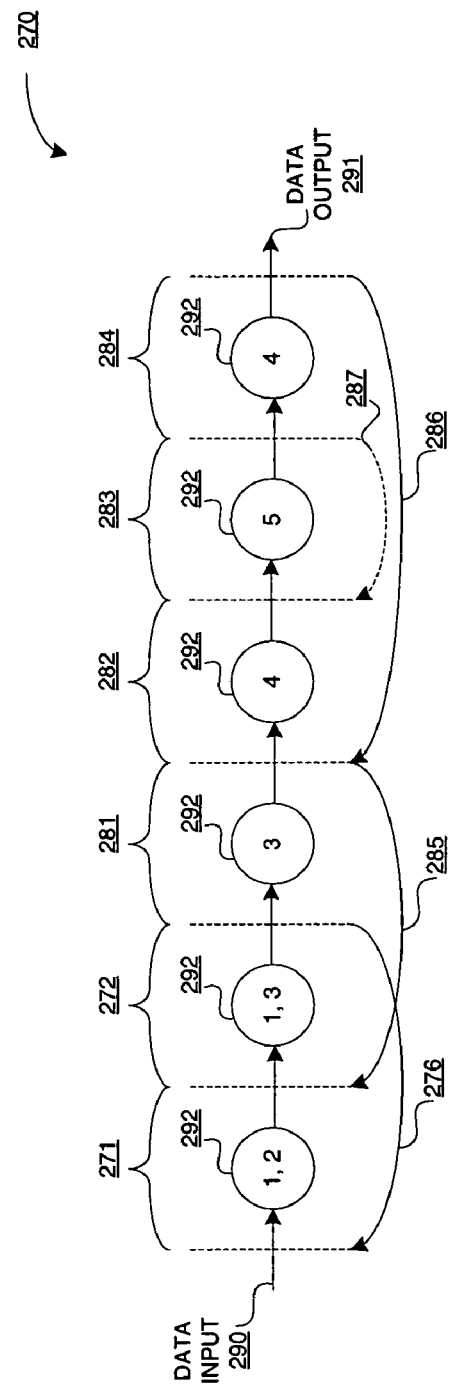
FIG. 3D is a graphical diagram depicting an exemplary embodiment of the pipeline of FIG. 3C, with additional sections coupled in series.

FIG. 3D is a graphical diagram depicting an exemplary embodiment of pipeline 270 of FIG. 3C, with additional sections coupled in series. In FIG. 3D, pipeline 270 includes sections 271 and 272, as previously described, as well as sections 281 through 284. Notably, such sections are coupled such that data in data input 290 flows in one direction, as it is processed through each of the stages sequentially to provide data output 291. Each section may include section registers, such as registers ("REG") 610 of FIG. 6A, at entry and exit points. These section registers may be used to ensure that the preceding wave has completed its access to a resource before a new wave enters that section. For example, section registers gating access to section 271 may wait until feedback signal 276 is asserted before allowing another wave of data input 290 to enter section 271. Notably, as with a pipeline by definition, waves of data may be processed at a time, though no two or more waves of data may be present in the same section at one time. In this example, in addition to the above description of resource usage of sections 271 and 272, section 281 uses resource 3, sections 282 and 284 use resource 4, and section 283 uses resource 5. Notably, feedback ("release") signals, such as signals 276, 285, and 286 in this example, may cross more than one section depending on the usage range of the resource associated with such signals. A section isolated inside another section may have no practical use for a release signal. Accordingly, release signal 287 may be removed as there is no purpose for this feedback loop, as no other section of pipeline 270 uses resource 5.

Accordingly, it should be appreciated that release signals protect resources inside a pipeline from being accessed by data prematurely. Again, the last use of a resource connects back to the first use of that same resource, which prevents two waves of data from accessing the same resource at the same time. Although FIG. 3D is described in terms of a single pipeline where each feedback signal corresponds to a specific resource, such as release signal 285 corresponds to release of resource 3, release signal 286 corresponds to release of resource 4, and release signal 276 corresponds to release of resource 1, it should be understood that in addition to intra-pipeline dependencies, there may be inter-pipeline dependencies where one or more of resources 1 through 5 are shared among one or more other pipelines. Accordingly, the release signals previously described may extend to other pipelines to indicate when pipeline 270 in this example has completed its use of a resource for a particular wave of data. Thus, while release signal 287 may be superfluous and thus may be omitted in an optimization of the control structure of pipeline 270, such release signal 287, or a separate unlocking signal described below, may be applicable with respect to inter-pipeline control of execution of dataflow processing.

At this juncture, it should be appreciated that a signal processing network may be explicitly represented as nodes, such as nodes 292, respectively within each section of a pipeline or pipelines, where each node indicates the resources used for such node. However, to handle resource sharing and maintain in-order execution for implementing multiple pipelines, each section of each pipeline may be gated by control circuits, such as section controllers described below, which control circuits may be coupled between pipelines. Section controllers use locking signals and unlocking signals to indicate to other sections in other pipelines that a resource is being used by a pipeline or unlocked for use by another pipeline, respectively. Thus, for each locking signal there may be a corresponding unlocking signal, where locking and unlocking signals may be used for shared resources only.

Locking and unlocking signals are used for inter-pipeline control. Section controllers may also use release signals for intra-pipeline control. Accordingly, when a pipeline starts processing data from a wave, such control circuitry is configured to send a locking signal to sections in other pipelines. This locking signal is used to prevent subsequent waves to execute out-of-order processing of data. However, once the resource being locked down has completed use for the then-current data wave being processing by such resource, an unlocking signal may be asserted from one of the section controllers of that pipeline to release that resource for use by other pipelines.

Figure 3E:
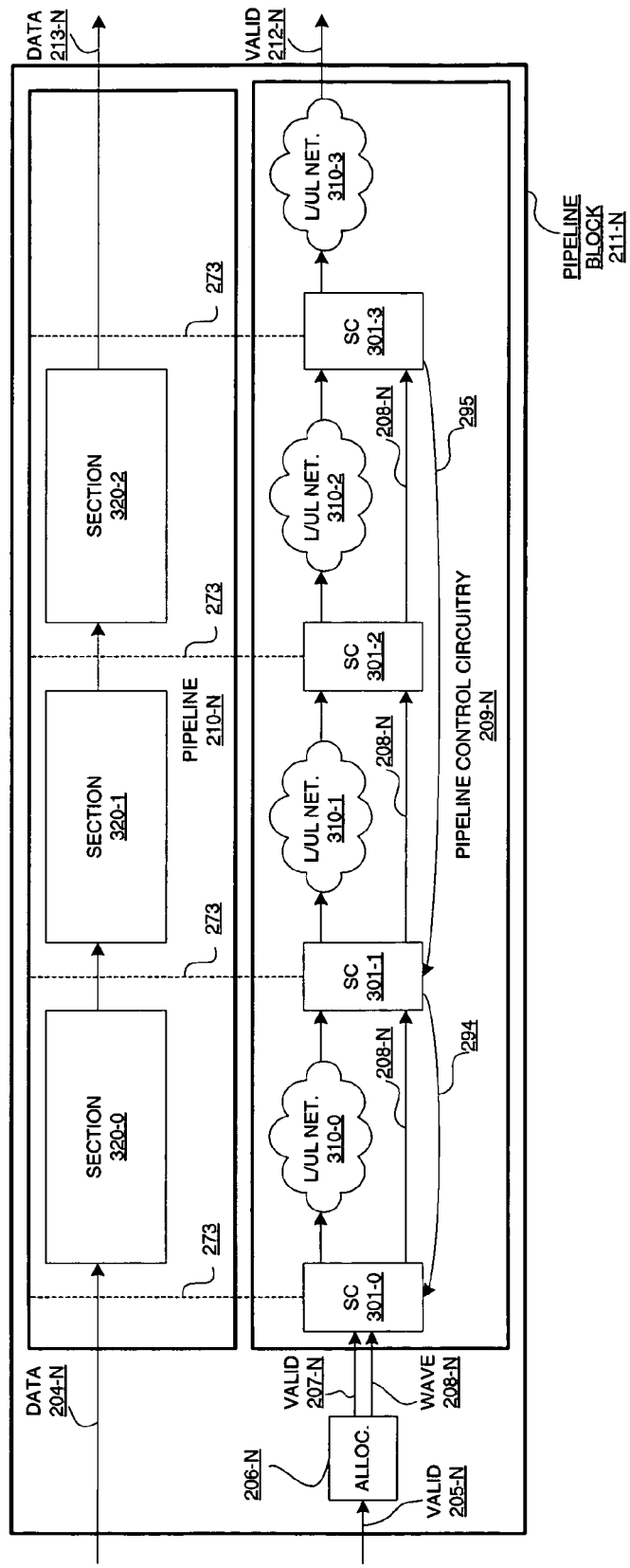
FIG. 3E is a block diagram depicting an exemplary embodiment of a pipeline block.

FIG. 3E is a block diagram depicting an exemplary embodiment of an $N^{th}$ pipeline block, namely, pipeline block 211-N. Pipeline block 211-N in this exemplary embodiment includes a pipeline 210-N and a pipeline control circuitry block 209-N. A wave is provided as data signal 204-N along with valid signal 205-N to an allocation unit 206-N. Again, it should be appreciated that multiple waves may be provided to multiple pipeline blocks, and the order of execution of these waves is to be maintained in order to provide a cohesive and meaningful output. Allocation unit 206-N requests resources responsive to a scheduled action provided to allocation unit 206-N. Allocation unit 206-N may therefore lock subsequent waves from passing boundaries that access the same resources as the scheduled action. More particularly, this locking is associated with shared use of stateful resources. As described below in additional detail, a lock signal is sent from an allocation unit in a pipeline to section controllers of other pipelines that share resources with the pipeline associated with the allocation unit to indicate such shared resource(s) are presently unavailable. Corresponding unlock signaling to the lock signal is sent from section controllers of the pipeline to section controllers of others pipelines again based on shared use of the resource(s) though to indicate present availability thereof. Notably, resources themselves are neither locked nor unlocked. Indeed, as shall be more fully appreciated from description that follows, such resources do not have to be locked or unlocked. Instead, section controllers regulate the control flow to ensure sequential access to stateful resources without having to lock or unlock the resources themselves.

Accordingly, allocation unit 206-N may issue a valid signal 207-N in response to valid signal 205-N, as well as a wave signal 208-N. Wave signal 208-N and valid signal 207-N are provided to an initial section controller ("SC"), namely section controller 301-0, of a pipeline block, namely pipeline block 211-N. Each section controller handles locking for entering an associated section, except for a last section controller of a pipeline block, namely section controller 301-3 in this example. Thus, section controller 301-0 handles locking for section 320-0; section controller 301-1 handles locking for section 320-1; section controller 301-2 handles locking for section 320-2, and section controller 301-3 handles unlocking of section 320-2. In this particular example, it is shown that wave signal 208-N is provided from section controller 301-0 to section controller 301-1, and then from section controller 301-1 to section controller 301-2, and then from section controller 301-2 to section controller 301-3. Usage of wave signal 308-N is described below in additional detail. Additionally, between each pair of section controllers is a locking/unlocking ("L/UL") network. Thus, for example, between section controllers 301-0 and 301-1 is coupled locking/unlocking network 310-0, between section controllers 301-1 and 301-2 is coupled locking/unlocking network 310-1, and between section controllers 301-2 and 301-3 is coupled locking/unlocking network 310-2. Additionally, at the end of each pipeline control circuitry block 209-N is a locking/unlocking network, namely locking/unlocking network 310-3 in this example coupled to the output of section controller 301-3. Output of a final locking/unlocking network of a pipeline control circuitry block is a valid data signal, namely valid data signal 212-N, which is associated with a data output signal from an associated pipeline, namely data output signal 213-N of pipeline 210-N. Valid data signal 212-N may be used for determining when data output from a pipeline may be loaded in a subsequent processing stage. In this example, a release signal 294 is provided from section controller 301-1 to section controller 301-0, and a release signal 295 is provided from section controller 301-3 to section controller 301-1, bypassing section controller 301-2. These release signals will depend upon resources used and the sequence of such resources used in each section of a pipeline, such as sections 320-0 through 320-2 of pipeline 210-N. Notably, though only three sections are shown for the above example, it should be appreciated that fewer or more sections may be implemented for a pipeline, and thus pipeline control circuitry will vary according to the number of sections implemented in a pipeline. The example of resources being used for the configuration of release signals 294 and 295 is described below in additional detail.

To recap with simultaneous reference to FIGS. 2 and 3A through 3E, it should be appreciated that from a dataflow model, one or more linearized pipelines are identified along with the resources used in each section of those pipelines. These pipelines are coupled to a scheduler. However, it should be appreciated that different sections of different pipelines may use one or more of the same resources. However, a wave of data may not enter a pipeline section until a section controller for the associated section receives unlocking signaling. In other words, the scheduling of shared resources is interactive across pipelines.

Figure 3F:
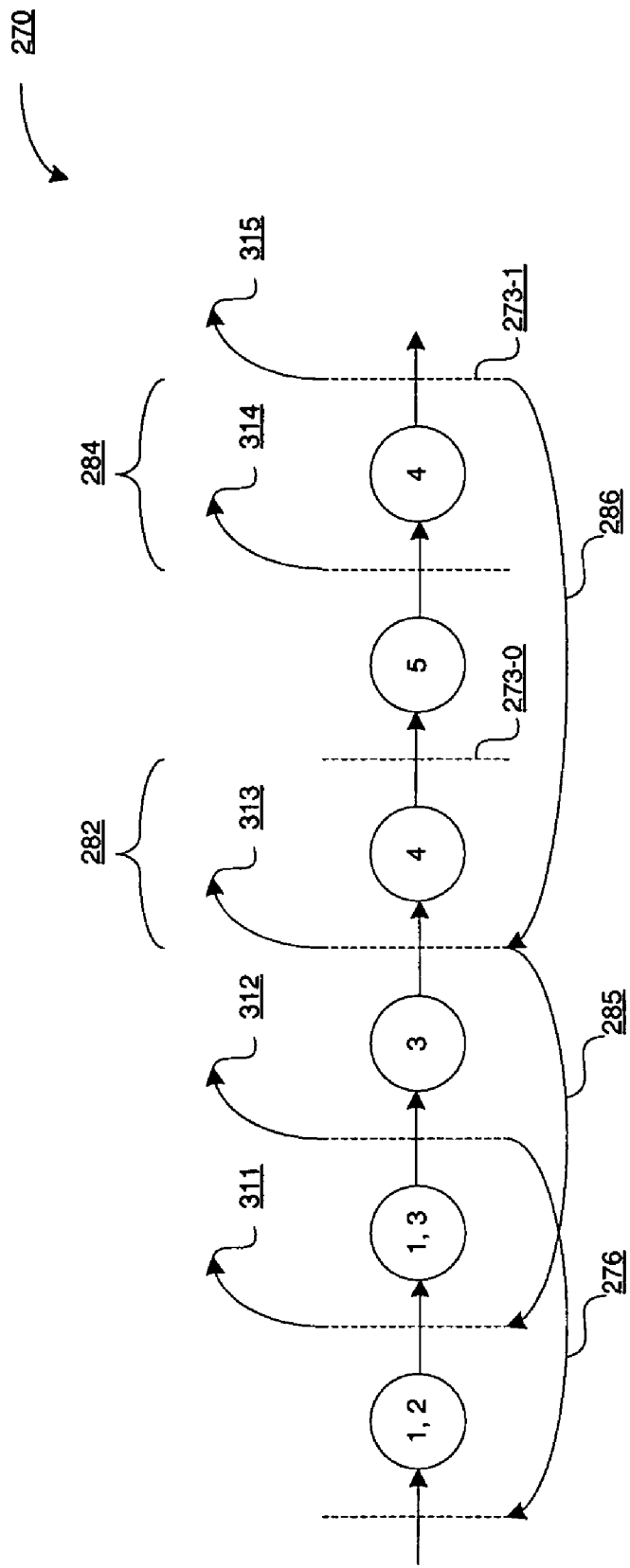
FIG. 3F is the graphical diagram of FIG. 3D with unlocking signals illustratively shown.

FIG. 3F is the graphical diagram of FIG. 3D with unlocking signals 311 through 315 illustratively shown. As previously described, whereas release signals, such as release signals 276, 285, and 286, are associated with intra-pipeline resource control, unlocking signals 311 through 315 are associated with inter-pipeline resource control. Thus, each pipeline, such as pipeline 270, has one unlock point for each resource it uses. Notably, unlock points may, though need not be, the same as exit points, as previously described. Furthermore, it should be understood that the unlocking point for each resource in a pipeline is the last use, or some time after the last use, of that resource within the pipeline. For example, resource 4 is unlocked responsive to unlock signal 315 at section boundary 273-1 and not at section boundary 273-0 even though both of sections 282 and 284 use resource 4. Continuing the example, unlock signal 311 is to unlock resource 2; unlock signal 312 is to unlock resource 1; unlock signal 313 is to unlock resource 3; and unlock signal 314 is to unlock resource 5. These unlocking signals, such as unlocking signals 311 through 315, may be provided to other pipelines for inter-pipeline control, as described below in additional detail. Thus, referring back to FIG. 3E, it should be understood that locking/unlocking networks, such as locking/unlocking networks 310-0 through 310-3, may be used to provide unlocking signals inter-pipeline. Furthermore, it should be appreciated that locking/unlocking networks 310-0 through 310-2 may be used to provide locking signals inter-pipeline associated with use of resources of a particular section, as described below in additional detail. Notably, section controller 301-3 only outputs unlocking signals and not locking signals, as it is at the end of pipeline control circuitry 209-N. In contrast, for example, section controller 301-0 may provide locking signals indicating that section 320-0 is using one or more resources, and because section controller 301-0 is at the beginning of pipeline control circuitry 209-N such section controller will not provide any unlocking signals. Intermediary section controllers, namely not at the beginning or the end of linearized pipeline control circuitry, of pipeline control circuitry 209-N may provide both locking and unlocking signals. For example, section controller 301-1 may provide unlocking signals associated with one or more resources used by section 320-0 and may provide locking signals associated with one or more resources used by section 320-1. Thus, an intermediary section controller may provide unlocking signaling for one or more resources used in advance of the section controller and locking signaling for one or more resources used behind the section controller.

Figure 4:
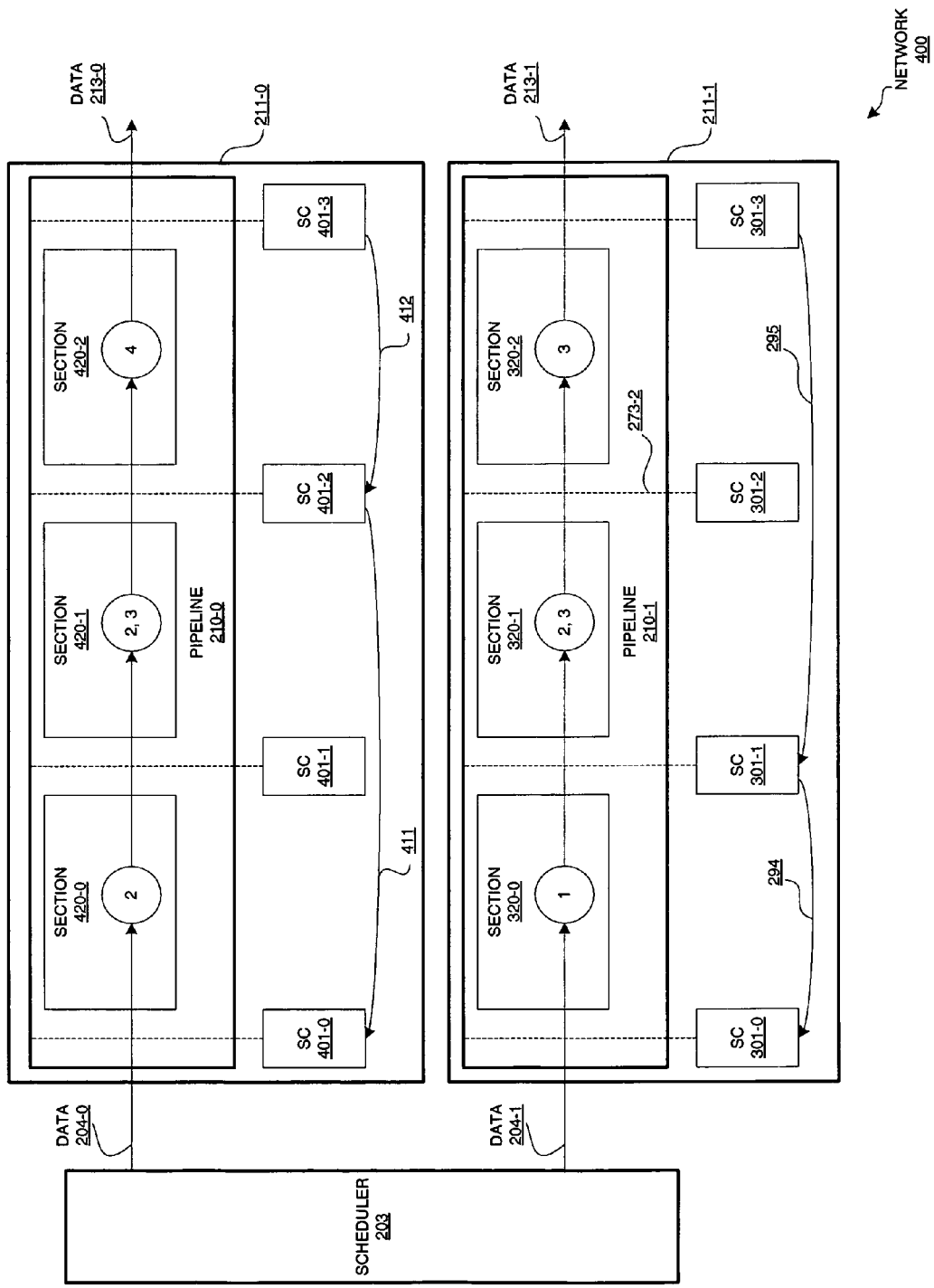
FIG. 4 is a block diagram depicting an exemplary embodiment of a data processing network.

For purposes of clarity by way of example, FIG. 4, which is a block diagram depicting an exemplary embodiment of a data processing network 400, is described with respect to example resources used by sections. For example, pipeline block 211-0 may have sections 420-0 through 420-2 for a pipeline 210-0. Section controller 401-0 controlling access to section 420-0 may provide locking signaling with respect to use of resource 2 in section 420-0. Moreover, section controller 401-1 gating access to section 420-1 may provide locking signaling with respect to use of resource 3 in section 420-1. Notably, section controller 401-1 does not provide unlocking signaling with respect to use of resource 2, as section 420-0 is not the last use of resource 2 in pipeline 210-0 of pipeline block 211-0. Furthermore, section controller 401-2 gating access to section 420-2 may provide locking signaling associated with use of resource 4 and may provide unlocking signaling with respect to use of resources 2 and 3. Lastly, section controller 401-3 may provide unlocking signaling with respect to unlocking of resource 4. Furthermore, the range of resource 2 is sections 420-0 and 420-1, and accordingly section controller 401-2 may provide a release signal 411 to section controller 401-0. Furthermore, the range of resource 4 of pipeline 210-0 is section 420-2, and accordingly section controller 401-3 may provide a release signal 412 to section controller 401-2. As the range of resource 3 is within the range of resource 2, no separate release signal is shown for releasing resource 3 as an optimization to enhance throughput.

With reference to pipeline 210-1 of pipeline block 211-1, section controller 301-0 gates access to section 320-0, and may provide a locking signal with respect to use of resource 1. Section controller 301-1, which gates access to section 320-1, may provide an unlocking signal associated with unlocking of resource 1, and may provide locking signals with respect to use of resources 2 and 3 by section 320-1. Section controller 301-2 may provide unlocking signaling associated with unlocking of resource 2. Notably, section controller 301-2 may not provide unlocking signaling associated with use of resource 3, as resource 3 may not be unlocked from pipeline 210-1 at boundary 273-2, as such boundary does not indicate the last use of resource 3 with respect to pipeline 210. Notably, the range of resource 1 for pipeline 210-1 is section 320-0, and accordingly section controller 301-1 may provide a release signal 294 to section controller 301-0. Furthermore, it should be appreciated that the range of resource 3 is sections 320-1 through 320-2 with respect to pipeline 210-1, and thus section controller 301-3 may provide a release signal 295 to section controller 301-1. Notably, with respect to intra-pipeline control, range of resource 2 is within the range of resource 3, and thus for purposes of enhancing throughput, no release signal for resource 2 is provided from section controller 301-2 to section controller 301-1.

Figure 6A:
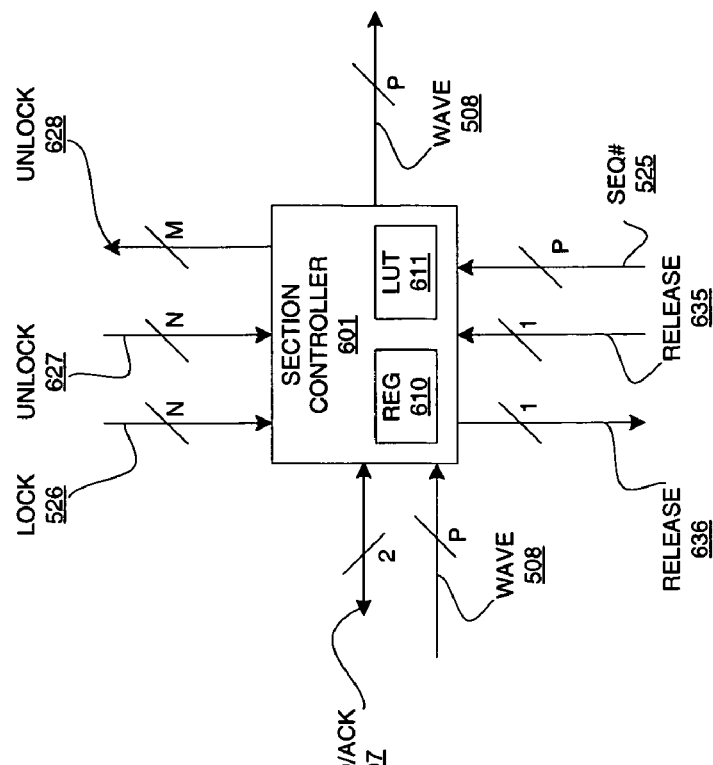
FIG. 6A is a block diagram depicting an exemplary embodiment of a section controller.
Figure 5A:
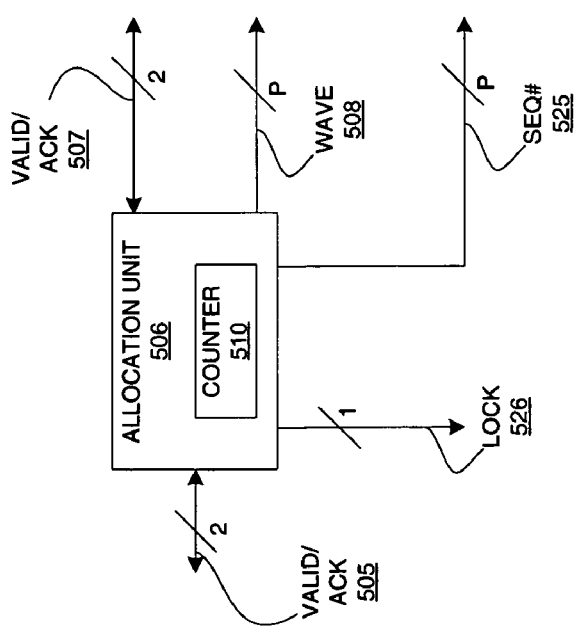
FIG. 5A is a block diagram depicting an exemplary embodiment of an allocation unit.

FIG. 5A is a block diagram depicting an exemplary embodiment of allocation unit 506. Allocation unit 506 may be an allocation unit 206 of FIG. 2. An example of an HDL listing 550 of an example implementation of allocation unit 506 is provided as FIG. 5-B1 and 5B-2. FIG. 6A is a block diagram depicting an exemplary embodiment of a section controller 601. Section controller 601 may be a section controller 301 of FIG. 3E for example. An HDL listing 650 of an example implementation of a section controller 601 is provided in FIGS. 6B-1, 6B-2, 6B-3, 6B-4, and 6B-5 in combination. With simultaneous reference to FIGS. 2, 3E, 5A and 6A, allocation unit 506 and section controller 601 are further described.

Allocation unit 506 performs a locking operation responsive to a valid signal, generally indicated as valid/acknowledge signals 505. Thus, in response to such a valid signal, allocation unit 506 asserts lock signal 526. Optionally, an acknowledge signal in response to a valid signal may be asserted, as generally indicated as valid/acknowledge signals 505. Each allocation unit 206 may assert one lock signal 526 in response to a respective valid signal 205, and thus for the example of N pipelines there may be N lock signals 526. Each lock signal 526 is provided to each section controller 601 of all pipeline control circuitry blocks 209. Thus, each section controller 601 may receive N lock signals 526 from N allocation units 206.

Each lock signal 526 is asserted along with a sequence number via sequence number signal 525, where both of signals 525 and 526, as well as signal 507 and 508, are responsive to a valid signal, generally indicated as valid/acknowledge signals 505. A wave counter 510 of allocation unit 506 is used to assign a unique identification number to each wave of data currently in an associated pipeline, such as for example allocation unit 206-N and pipeline 210-N. This identification number for each wave is provided via wave signal 508 by allocation unit 506. Additionally, from sequence number signal 525, a sequence number, P bits wide, is provided to each section controller 601 in the pipeline associated with allocation unit 506. This sequence number is an increment above a current wave number, P-bits wide, provided via wave signal 508. Thus, such sequence number may too be provided from wave counter 510. In other words, a sequence number is associated with a next wave to be received for scheduling for that pipeline.

Accordingly, each section controller 601 in a pipeline is provided with a wave number for an action currently in that pipeline. Notably, wave signal 508 may be daisy-chained from section controller to section controller. Thus, for the example of multiple waves within a pipeline, each section controller will know which wave is a current wave, and which wave should be the next scheduled wave. Notably, each wave number and section number associated with a pipeline block may be limited, as in this example, to section controllers in the same pipeline. Section controller 601 may include one or more registers 610 for resource usage range management and for storing the current value of a wave. Section controller 601 may include a lookup table ("LUT") 611 to store each sequence number and an associated lock state responsive to assertion of sequence number signal 525 and lock signal 526 from allocation unit 506.

By comparing a current wave number to a sequence number, a section controller can determine whether to allow the wave to pass into a section. This facilitates each wave to be processed in sequence as between pipelines. Waves preceding a sequence number with a lock condition are allowed to pass. However, if a current wave number is equal to or higher than a sequence number, a current wave associated with such wave number would not be allowed to proceed. Rather, only waves with numbers lower than each sequence number in a lookup table are allowed to pass. In other words, inter-pipeline processing may be done sequentially for multiple waves of data. For example, suppose action 1 takes more time to process than action 2. As action 1 is provided from scheduler 203 before action 2, a lock signal asserted by allocation unit 206-0 locks all resource associated with pipeline 210-0, which locks out all such resources from processing of action 2 by pipeline 210-1. If there is a shared resource between pipelines 210-0 and 210-1, then a section controller associated with controlling access to such resource in pipeline 210-0 will prevent pipeline 210-1 from accessing such resource until action 1 has been processed by such resource and transitioned out of the section. So, even if action 2 is ready to be processed by such resource and action 1 has not reached an entry point for such resource, action 2 will be stopped from accessing this resource until action 1 has passed the exit point for this resource. Notably, once action 1 has transitioned from the exit point for this shared resource, the section controller will unlock the resource. This unlocking may be done by removing the sequence number and associated lock condition from LUT 611.

Accordingly, subsequent waves scheduled on pipelines other than the pipeline associated with allocation unit 506 may be blocked when they try to enter a section that requests a resource used by the pipeline associated with allocation unit 506. As resources become available owing to completed use by a pipeline of such resources, unlocking signals, such as unlock signals 627, are provided by section controllers to other section controllers to allow such subsequent waves to proceed. Notably, a section controller may or may not provide any unlock signals 628 depending on whether it is located at an exit boundary for a last use of a resource by a pipeline with which such section controller controls. Notably, there are not M different unlock signals, but only one unlock signal that is sent to M possible locations or section controllers, and thus M may be thought of as an integer greater than or equal to 0. In other words, section controller 601 when controlling an exit boundary of a section from which M resources may be unlocked, may issue up to M unlock signals. As resources are unlocked, blocked waves may be allowed to continue execution.

Section controllers, such as section controller 601, may manage when data is allowed to enter a section. Conditions for entry into a section are that the section controller is controlling an entry point to a section and no other wave of data currently exists between the entry and exit points of a section; the entering wave number may not be locked by other pipelines; and the input data signal is valid. It should be understood that a section is guarded by section controllers, and thus there is one section between two section controllers. A pipeline may include a sequence of such sections. Thus, at most one execution wave may be active inside a section at any point in time. However, a section may be arbitrarily large, where at the upper end limit a section includes the entire pipeline. Whether a data signal is valid is determined by allocation unit 506, which issues a valid signal and waits for acknowledgment, generally shown as valid/acknowledge signals 507. Acknowledge signaling is optional. Valid/acknowledge signals 507 may be provided between sections of a pipeline in a daisy-chained manner.

Responsive to conditions for allowing data to enter a section all being met, data is allowed into such section, which causes a transition into a next section and triggers connected section controllers to perform operations. These operations performed by section controllers coupled to the section controller allowing entry into a section may include one or more of: sending one or more unlock signals to other section controllers of other pipelines associated with any shared resources unlocked by such transition; sending one or more release signals to one or more respective entry points for one or more resources; and sending a lock signal responsive to the entry point of the transition.

As described above, there may be a release signal 636 to release one or more resources by a section controller 601. Furthermore, a section controller 601 may be informed that a resource is released, such as via release signal 635. Release signals 636 and 635 may be thought of enter and exit signals, respectively. Release signaling was described above in more detail with respect to intra-pipeline control of resources, and thus such description is not repeated.

The number of bits P, for P an integer greater than 0, for wave numbers and sequence numbers as respectively associated with wave signal 508 and sequence number signal 525 may be determined by the number of bits needed to uniquely identify each pipeline section within a pipeline. To limit P, namely the number of bits used for sequence and wave numbers, counter 510 may be a wrap around counter. For example, counter 510 may be configured to count to the binary log of X, where X is the number of sections in a pipeline. Thus, the binary log of X is the number of bits used to provide P, where a wraparound condition may be used to control the size of the number of bits implemented.

Furthermore, the number of entries in LUT 611 may be N deep. In other words, the number of entries may be dependent on number of pipelines. For example, the number of pipelines may be used as an upper bound for the number of entries in LUT 611. More precisely, each entry may correspond to one lock/unlock signal pair coupled to a section controller, coming from, respectively, an allocation unit and section controller in another pipeline. If, however, a section controller does not guard a use of a resource that conflicts with some other pipeline, then such other pipeline need not be coupled to the section controller, hence the size or depth of LUT 611 may be less than the total number of pipelines. The N entries are for sequence numbers for the pipeline associated with section controller 601. An entry is deleted responsive to assertion of an unlock signal 627 for such entry. The amount of bits or state to be stored in LUT 611 is equal to the number of sections times P. Notably, because equality is used with respect to lookup, no wrap around problem exists.

As mentioned above, for N pipelines there are N possible lock signals 526 provided to each section controller 601. Furthermore, for N pipelines, there are N possible unlock signals 627 provided to each section controller 601. Notably, there is no upper bound on the number of resources, as the locking/unlocking flow control does not act on resources, but acts on parts of a program, namely sections.

Sequence numbers need only be known to section controllers within the pipeline block in which they originate, and thus the only signals going between pipelines may be for locking and unlocking. Thus, the hardware cost for interconnecting pipelines with dependent actions, namely actions that share resources, may only involve wiring for lock and unlock signals between pipeline blocks. Furthermore, it should be appreciated that section controllers, which manage access to shared resources, do not have a high hardware cost, especially if there are no dependencies. If there are no dependencies, the hardware cost may be as little as only one register bit for resource usage range management.

Operation of a valid signal, generally indicated as valid/acknowledge signals 507, may be premised on either a dynamic data dependent condition or a previous controller static scheduling condition. With respect to static scheduling, when data processing time of a section is known, static scheduling may optionally be applied. This may remove overhead from the dataflow protocol. Instead of waiting for valid signals at an exit point of a section, a delay line for the input valid signal may be used. For example, the internal dataflow protocol may be removed during synthesis and replaced with a static delay value. Moreover, if a static delay value may be determined, some locking and unlocking points may be removed safely as there is a fixed relationship between two sections. This type of optimization is described below in additional detail.

Figure 7A:
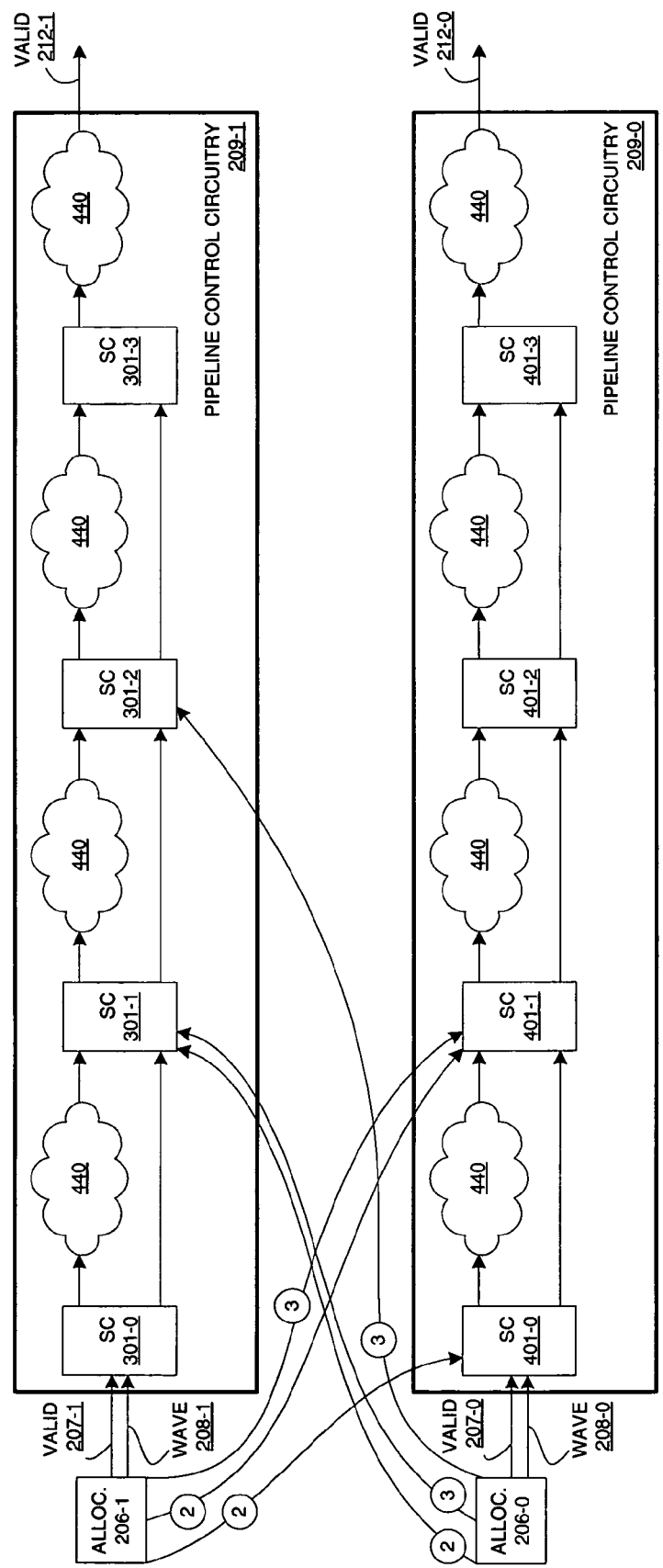
FIGS. 7A, 7B, and 7C are high-level block diagrams depicting an exemplary embodiment for optimizations of the data processing network of FIG. 4.
Figure 7B:
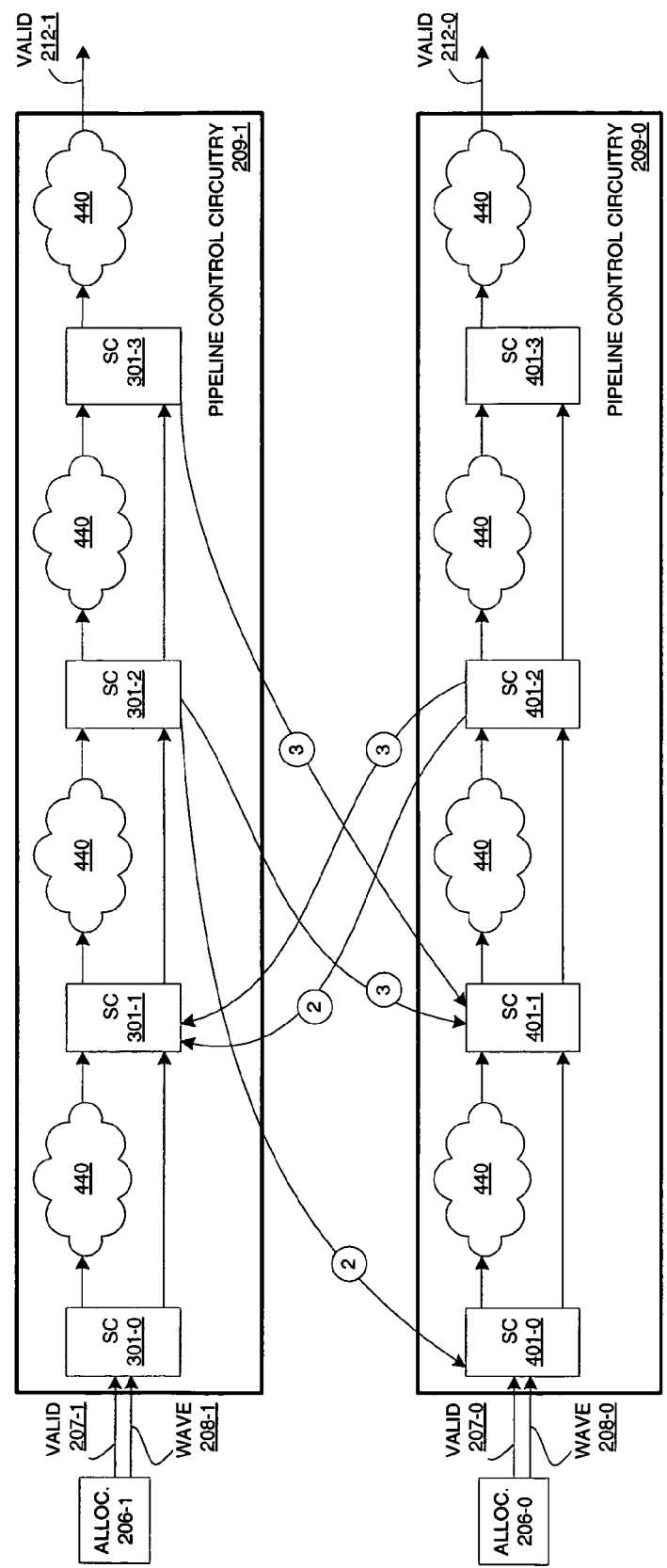
Figure 7C:
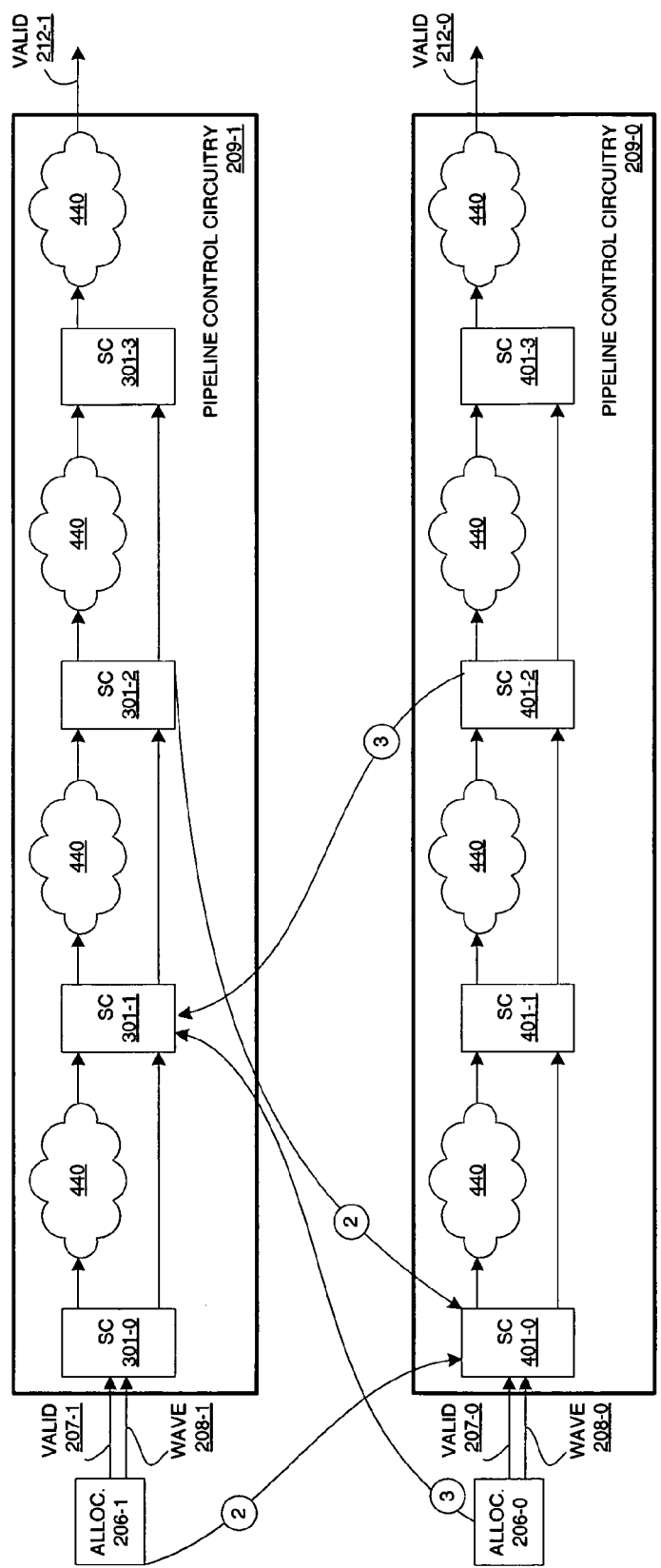

FIGS. 7A through 7C are block diagrams depicting an exemplary embodiment for optimizations of a portion of the data processing network of FIG. 4. Notably, optimizations may, though need not be, used. However, use of one or more optimizations may result in reduction in the number of traces or LUT entries.

With reference to FIG. 4 and FIGS. 7A through 7C, lock signaling and unlock signaling for the example of FIG. 4 are further described. Notably, it should be appreciated that in FIGS. 7A though 7C, networks 440 may be used to represent processing delay between section controllers in addition to signal networks, and locking and unlocking signals, which are part of networks 440, are shown coupling pipeline blocks.

More particularly, with respect to FIG. 7A, lock signaling is shown. Lock signals from allocation unit 206-1 to section controllers 401-0 and 401-1 are provided to lock resource 2. Furthermore, a lock signal from allocation unit 206-1 to section controller 401-1 is provided to lock resource 3. Notably, there is no locking of resource 1 by allocation unit 206-1, as the pipeline associated with allocation unit 206-0 does not utilize resource 1.

Additionally, allocation unit 206-0 provides a lock signal to section controller 301-1 to lock resource 2. Furthermore, allocation unit 206-0 provides respective lock signals to section controllers 301-1 and 301-2 to lock resource 3.

With reference to FIG. 7B, section controller 301-2 provides an unlock signal to section controller 401-0 to unlock resource 2, and section controller 301-2 provides an unlock signal to section controller 401-1 to unlock resource 3. Furthermore, section controller 301-3 provides an unlock signal to section controller 401-1 to unlock resource 3. Notably, there are two unlock signals for resource 3 emanating from pipeline control circuitry 209-1, even though as mentioned above there is only one unlock signal employed for each resource used by a pipeline. Thus, it should be appreciated that the unlock network of FIG. 7B has yet to be optimized. Additionally, it should be noted that unlock signals are provided from section controller 401-2 to section controller 301-1 to unlock resources 2 and 3, respectively. Thus, it should be appreciated that the combination of FIGS. 7A and 7B provide a full dependency graph for lock and unlock signals for pipeline blocks 211-0 and 211-1 of FIG. 4. It should be appreciated that that these lock/unlock signals may form a portion of lock/unlock networks 440.

The same rationale with respect to a resource being within a range of another resource may be applied to locking and unlocking signals being within the range of other locking and unlocking signals, respectively. As a first optimization, overlapping lock and unlock instances may be removed. Thus, for example, with reference to overlapping lock signals as illustratively shown in FIG. 7A, allocation unit 206-1 provided lock signal for locking resource 2 provided to section controller 401-1 may be removed. Furthermore, allocation unit 206-0 provided lock signal for locking resource 2 provided to section controller 301-1 may be removed, and the lock signal from allocation unit 206-0 to section controller 301-2 to lock resource 3 may be removed.

Furthermore, with respect to overlapping unlock signals as illustratively shown in FIG. 7B, the unlock signal from section controller 301-2 to section controller 401-1 for unlocking resource 3 may be removed, and the unlock signal from section controller 401-2 to section controller 301-1 for unlocking resource 2 may be removed.

Another optimization may be performed if computation times may be determined. In instances where computation times may be determined, locks may be removed where they are not needed due to computational delay of each section. For example, if a first action uses resource 3 for a shorter time than it takes to process data through resource 2 in a second action, these dependencies may be safely removed. For example, if computation time 440 between section controllers 301-2 and 301-3 is equal to 1 unit of time, and computation time 440 between section controllers 401-1 and 401-2 is 5 units of time, the lock signal from allocation unit 206-1 to section controller 401-1 for resource 3 may be removed. Notably, the ratio of 5 to 1 units of time is merely an example, and smaller or larger timing differences may be used as may vary from application to application.

Additionally, for the example of computational delays given above and with reference to FIG. 7B, the unlock signal from section controller 301-3 to section controller 401-1 for unlocking resource 3 may be removed. In FIG. 7C, the lock and unlock signals illustratively shown in FIGS. 7A and 7B have been reduced in number, and hence optimized, by removing the overlapping signals as described herein as well as the unlock signal removed owing to processing delays.

As described above, optimizations may be employed to reduce dependencies. Thus, for example, during compile time for code generation, locking and unlocking dependencies and associated storage space for locked waves may be reduced by analyzing actions. Other optimizations may be performed, including one or more of: avoiding redundant locking and unlocking situations; maximizing interleaved waves to minimize lock stack size; determining when stateless sharing may be applied; using a static number of clock cycles between section control input and section control output to generate a simplified control logic; and adding additional pipelining to improve clock frequency. With respect to avoiding redundant locking situations, it should be understood that it may be beneficial to avoid locking resources that are locked anyway or are not overlapping. This avoidance may be determined by analyzing delays associated with a pipeline.

Additionally, although throughput performance may be degraded, unlocks may be moved downstream in a pipeline. Accordingly, a degree of concurrency of operation may be lost in favor of network simplification, as an unlock signal may be moved to encompass the unlocking of one or more other resources. These one or more other resources may have their associated unlock signals removed in favor of the unlock signal move to encompass them.

Static stateless resource sharing may be applied to sections that do not overlap. Since sections define regions where only one user may access a stateful resource at a time, this also applies to stateless resources. Dynamic resource sharing deadlocks may be avoided by analyzing resource sharing before code generation, this analysis may be done by forming linearized pipelines as described above. In addition to static resource sharing performed during translation, dynamic resource sharing may be specified by a user. A user may select two components to share a same physical block of circuitry. Notably, user constraints could possibly result in a deadlock situation which should be removed before code generation. Static resource sharing and side locking mechanisms may not cause performance degradation in instances of folding or dynamic scheduling. Accordingly, sharing static resources and side locking mechanisms may be employed for sharing of stateless resources.

Figure 8:
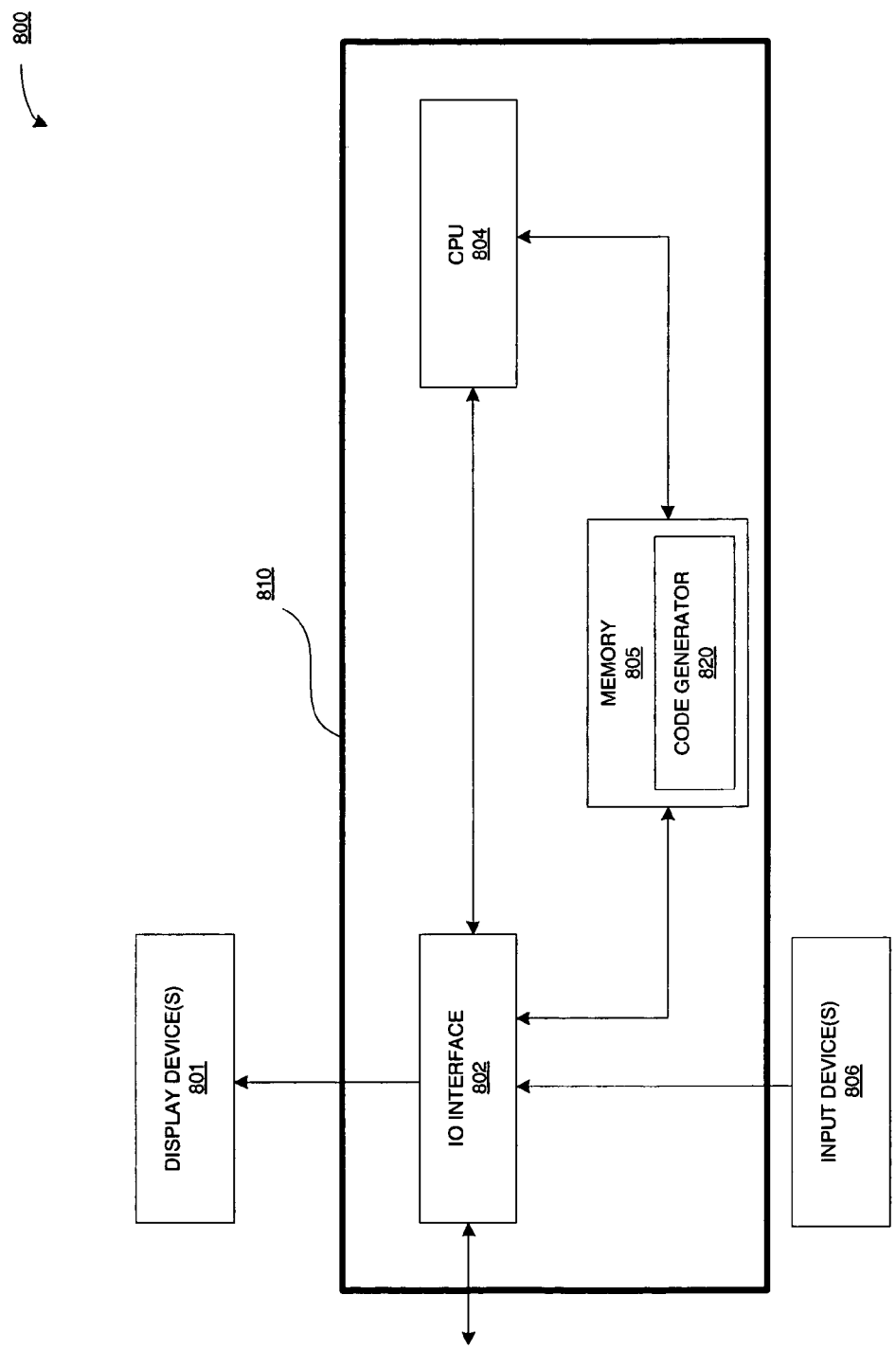
FIG. 8 is a block diagram of an exemplary embodiment of a computer system.

FIG. 8 is a block diagram of an exemplary embodiment of a computer system 800. Computer system 800 may include a programmed computer 810 coupled to one or more display devices 801, such as Cathode Ray Tube ("CRT") displays, Plasma displays, Liquid Crystal Displays ("LCD"), and to one or more input devices 806, such as a keyboard and a cursor pointing device. Other known configurations of computer system 800 may be used.

Programmed computer 800 may be programmed with a known operating system ("OS"), which may be OS/2, MAC OS, Java Virtual Machine, Linux, Solaris, UNIX, or a Windows operating system, among other known platforms. At least a portion of an operating system may be disposed in memory 805. Memory 805 may include one or more of the following: random access memory, read only memory, magneto-resistive read/write memory, optical read/write memory, cache memory, magnetic read/write memory, and the like, as well as signal-bearing media as described below.

Programmed computer 800 includes a central processing unit (CPU) 804, memory 805 and an input/output ("IO") interface 802. CPU 804 may be a type of microprocessor known in the art, such as available from Intel, IBM, Apple Computer, and Advanced Micro Devices for example. Support circuits (not shown) may include conventional cache, power supplies, clock circuits, data registers, and the like.

IO interface 802 may include chip set chips, graphics processors, and daughter cards, among other known circuits. An example of a daughter card may include a network interface card ("NIC"), a display interface card, a modem card, and a Universal Serial Bus ("USB") interface card, among other known circuits. Thus, IO interface 802 may be coupled to a conventional keyboard, network, mouse, display printer, and interface circuitry adapted to receive and transmit data, such as data files and the like. Notably, programmed computer 810 may be coupled to a number of client computers, server computers, or any combination thereof via a conventional network infrastructure, such as a company's Intranet and/or the Internet, for example, allowing distributed use for interface generation.

Memory 805 may be directly coupled to CPU 804 or coupled through IO interface 802. Memory 805 may store all or portions of one or more programs or data to implement processes for a code generator 820, such as may be associated with all or part of code generation flow 250 of FIG. 3A, to provide code for configuring an FPGA with parallel pipelines. Additionally, those skilled in the art will appreciate that one or more aspects of the invention may be implemented in hardware, software, or a combination of hardware and software. Such implementations may include a number of processors independently executing various programs and dedicated hardware or programmable hardware.

One or more program(s) of the program product code generator 820, as well as documents thereof, may define functions of embodiments in accordance with one or more aspects of the invention and can be contained on a variety of signal-bearing media, such as computer-readable media having code, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Furthermore, such signal-bearing media may be in the form of a carrier wave or other signal propagation medium via a communication link for streaming information, including downloading all or a portion of a computer program product. Such signal-bearing media, when carrying computer-readable instructions that direct functions of one or more aspects of the invention, represent embodiments of the invention.

While the foregoing describes exemplary embodiment(s) in accordance with one or more aspects of the invention, other and further embodiment(s) in accordance with the one or more aspects of the invention may be devised without departing from the scope thereof, which is determined by the claim(s) that follow and equivalents thereof. Claim(s) listing steps do not imply any order of the steps. Trademarks are the property of their respective owners.

What is claimed is:

1. A signal processing network, comprising:
pipeline blocks implemented in hardware and in parallel;
each of the pipeline blocks coupled to receive control signaling and information signaling from a scheduler;

the scheduler being a dataflow device coupled to receive data for providing the control signaling and the information signaling;

the scheduler configured to receive tokens from respective first-in, first-out buffers, the tokens being amounts of data;

the control signaling indicating validity of the data of the information signaling;

each pipeline block of the pipeline blocks including an allocation unit, a pipeline, and section controllers;

the pipeline sectioned into one or more stages, the section controllers being serially coupled to one another with each stage of the one or more stages being between two consecutive ones of the section controllers such that each entry boundary and exit boundary of each said stage of the one or more stages is controlled by the section controllers;

the pipeline coupled to receive an information signal of the information signaling from the scheduler;

the allocation unit coupled to receive a control signal of the control signaling from the scheduler;

the control signal being one of a sequence of control signals of the control signaling;

the control signal being for loading of data of an information signal of the information signaling into the pipeline in the pipeline block having the allocation unit which receives the control signal;

the allocation unit configured to provide a lock signal to the section controllers in each of the pipeline blocks, the lock signal indicating that resources targeted for use by the pipeline associated with the allocation unit are being locked;

the allocation unit configured to provide sequence information indicating a position in the sequence to the section controllers of the pipeline block associated with the allocation unit;

the sequence information including a wave number and a sequence number;

the wave number being associated with a data wave currently in the pipeline block associated with the allocation unit issuing the wave number;

the sequence number being incremented above the wave number to indicate a next wave number for scheduling a next data wave for the pipeline block associated with the allocation unit issuing the sequence number;

the section controllers configured to maintain in order inter-pipeline block execution among the pipeline blocks responsive to the sequence information and the lock signal and configured to provide unlock signaling;

each of the section controllers configured to compare the wave number to the sequence number;

wherein a section controller of the section controllers is configured to determine from such comparison whether to allow the data wave to pass into a stage of the one or more stages associated with the pipeline block having the section controller for in-sequence processing of multiple data waves among the pipeline blocks;

the resources being shared resources among two or more of the pipeline blocks; and the section controllers of the pipeline block configured to provide locking and unlocking signaling for inter-pipeline control for access to the shared resources without locking or unlocking the shared resources themselves.

2. The signal processing network according to claim 1, wherein a lock state of a shared resource of the shared resources is stored in a section controller of the section controllers asserting a lock thereof.

3. The signal processing network according to claim 1, wherein the section controllers are configured to unlock the shared resources when the shared resources become available.

4. The signal processing network according to claim 3, wherein a section controller of the section controllers of the pipeline block provides the unlock signaling to the section controllers remaining in each of the pipeline blocks for inter-pipeline control.

5. The signal processing network according to claim 4, wherein the control signal is provided from the allocation unit to each of the section controllers within the pipeline block in which the allocation unit is located.

6. The signal processing network according to claim 5, wherein the sequence information is provided to each of the section controllers within the pipeline block in which the allocation unit that receives the control signal is associated.

7. The signal processing network according to claim 6, wherein the signal processing network is disposed in an integrated circuit.

8. The signal processing network according to claim 7, wherein the integrated circuit is a programmable logic device, wherein each of the pipeline blocks is instantiated in programmable logic of the programmable logic device.

* * * * *